United States Patent
Lemoine et al.

(10) Patent No.: US 12,530,980 B2
(45) Date of Patent: Jan. 20, 2026

(54) METHOD FOR IDENTIFYING A LANDING ZONE, COMPUTER PROGRAM AND ELECTRONIC DEVICE THEREFOR

(71) Applicant: THALES, Courbevoie (FR)

(72) Inventors: Olivier Lemoine, Merignac (FR); Nicolas Lepron, Merignac (FR); Matthieu Grossetete, Merignac (FR)

(73) Assignee: THALES, Courbevoie (FR)

( * ) Notice: Subject to any disclaimer, the term of this patent is extended or adjusted under 35 U.S.C. 154(b) by 320 days.

(21) Appl. No.: 18/084,287

(22) Filed: Dec. 19, 2022

(65) Prior Publication Data
US 2023/0196931 A1 Jun. 22, 2023

(30) Foreign Application Priority Data
Dec. 20, 2021 (FR) ..................... 21 13975

(51) Int. Cl.
*G08G 5/54* (2025.01)
*G08G 5/21* (2025.01)
*G08G 5/74* (2025.01)
*G08G 5/76* (2025.01)

(52) U.S. Cl.
CPC ............ *G08G 5/54* (2025.01); *G08G 5/21* (2025.01); *G08G 5/74* (2025.01); *G08G 5/76* (2025.01)

(58) Field of Classification Search
CPC .... G08G 5/025; G08G 5/0021; G08G 5/0086; G08G 5/0091; G08G 5/0039; B64D 43/00; B64D 45/08; G01C 23/005
See application file for complete search history.

(56) References Cited

U.S. PATENT DOCUMENTS

| | | | |
|---|---|---|---|
| 2010/0156758 A1* | 6/2010 | Anders ................ | G01C 23/005 701/16 |
| 2010/0295706 A1* | 11/2010 | Mathan .................. | G02B 27/01 345/156 |
| 2014/0002280 A1* | 1/2014 | He .......................... | G05D 1/12 340/946 |

(Continued)

FOREIGN PATENT DOCUMENTS

| | | |
|---|---|---|
| BE | 901.238 | 3/1985 |
| FR | 2 893 146 | 5/2007 |

(Continued)

OTHER PUBLICATIONS

French Search Report dated Jul. 19, 2022, for FR 2113975, 2 pp.

*Primary Examiner* — Navid Z. Mehdizadeh
*Assistant Examiner* — Shelley Marie Osterhout
(74) *Attorney, Agent, or Firm* — NIXON & VANDERHYE

(57) ABSTRACT

Disclosed is a method for identifying a landing zone and for displaying on a head-up display system onboard an aircraft, a symbol conforming to the landing zone, the aircraft being apt to fly over a terrain and to land on the landing zone of the terrain. The aircraft is a helicopter, a drone or an electric aircraft with vertical take-off and landing. The method includes at least the following steps:—a hovering phase of the aircraft over the landing zone and acquisition of the geographical position of the landing zone;—a flight of the aircraft towards the landing zone and display on the head-up display system, of a symbol conforming to the landing zone at the measured geographic position.

9 Claims, 6 Drawing Sheets

(56) References Cited

U.S. PATENT DOCUMENTS

| | | | | |
|---|---|---|---|---|
| 2018/0218621 A1* | 8/2018 | Canale | ................ | G08G 5/0039 |
| 2020/0020238 A1* | 1/2020 | Baudry | ................ | G01C 23/005 |
| 2022/0041298 A1* | 2/2022 | Schurek | ............... | G08G 5/0086 |
| 2023/0027342 A1* | 1/2023 | Kojima | ................ | B64D 47/08 |

FOREIGN PATENT DOCUMENTS

| | | |
|---|---|---|
| FR | 3 083 779 | 1/2020 |
| FR | 3 110 728 | 11/2021 |

\* cited by examiner

METHOD FOR IDENTIFYING A LANDING ZONE, COMPUTER PROGRAM AND ELECTRONIC DEVICE THEREFOR

CROSS-REFERENCE TO RELATED APPLICATION

This application claims priority to FR 21 13975 filed Dec. 20, 2021, the entire contents of which are hereby incorporated by reference.

BACKGROUND OF THE INVENTION

Field of the Invention

The present invention relates to a method for identifying a landing zone.

The invention further relates to a computer program comprising software instructions which, when executed by a computer, implement such a method.

The invention further relates to an electronic device for identifying a landing zone.

The invention relates more particularly to a helicopter, while being applicable to a drone or an electric aircraft with vertical take-off and landing.

The invention relates more particularly to assisting the landing of the helicopter on a landing zone. Such assistance is particularly useful to the pilot when the landing zone is located on any sort of terrain, e.g. outside an airfield, and when the viewing conditions of the landing zone are degraded.

This is more particularly the case of helicopter landings on areas with sand, dust or snow.

DESCRIPTION OF THE RELATED ART

When a helicopter takes off from a landing zone or takes off from an unprepared landing zone, if there are particles on the ground, the particles are lifted by the air flow generated by the main rotor of the helicopter, forming a cloud which obstructs the pilot's vision and can even make the pilot loose the visibility of his/her environment thereof. Two phenomena in particular are well known and highly accident-prone: the so-called brown-out phenomenon, which occurs in the presence of sand or dust, and the so-called white-out phenomenon, which occurs in the presence of light snow.

Also, during a landing of a helicopter in conditions of reduced visibility due to the intensity of light, e.g. at night, or when facing a low sun on the horizon, the pilot can lose the visual references which are essential to the safety of the operation.

Such conditions leading to the loss of visual references cannot always be avoided. Operations in desert areas where sand is present on most landing zones for helicopters, operations in areas where snow is present, e.g. during mountain rescue or emergency medical rescue operations requiring to perform a ground effect hovering or to land on unprepared terrain, sometimes at night, sometimes on dusty surfaces, can be included in particular.

There is thus a need to assist the pilot for any operation close to the terrain and to obstacles (take-off, landing, ground effect steady flight), in order to allow the pilot to fly the helicopter safely with respect to the close external environment thereof, and hence to avoid the spatial disorientation inherent to the loss of external visual references and highly dangerous in such flight phases.

In order to assist the pilot, it can be considered to equip the helicopter with various sensors which would provide the pilot with a better perception of his/her environment thereof, such as millimeter radars, LIDARs or infrared sensors. In order to be able to handle all types of reduced visibility conditions during the take-off/landing operations, and in particular the different sizes of suspended particles (sand, dust, snow), but also the different types of approach/take-off, taking into account the wind, a solution based on such sensors requires combining technologies (millimeter radar, lidar, infrared, etc.) with different performances depending on the type of obscurant, and developing new wide-field products for covering the needs of helicopters, which makes such an approach complex and costly.

Devices for displaying, on a display system, a symbology representing the area to be placed, are also known. However, such a solution requires to know, before arriving on the zone, the precise geographical coordinates of the landing zone, in particular along the vertical axis, which is often not the case.

The goal of the invention is thus to propose an assistance method for piloting under conditions of reduced visibility, which would make landing possible on unprepared and unknown terrain, the method being easy and inexpensive to implement.

SUMMARY OF THE INVENTION

To this end, the subject matter of the invention is a method for identifying a landing zone and for displaying on a head-up display system onboard an aircraft, a symbol matching said landing zone, the aircraft being apt to fly over a terrain and to land on said landing zone of the terrain, the aircraft being a helicopter, a drone or an electric vertical take-off and landing aircraft, the method comprising at least the following steps:
a hovering phase of the aircraft over the landing zone and the acquisition of the geographical position of the landing zone;
a flight of the aircraft towards the landing zone and the display; on the head-up display system, of a symbol matching the landing zone at the recorded geographical position.

According to other advantageous aspects of the invention, the method comprises one or a plurality of the following features, taken individually or according to all technically possible combinations:
the hovering phase is carried out at a height of more than 15 m from the ground;
the acquisition of the geographical position of the landing zone is carried out by the actuation of a control by an operator of the aircraft, during hovering;
the acquisition step includes the sub-steps of:
acquisition of the latitude and the longitude of the landing zone by means of a satellite positioning system onboard the aircraft;
acquisition of the relative height of the aircraft above the landing zone by means of a radio altimeter onboard the aircraft;
acquisition of the altitude of the aircraft by means of a barometric altimeter onboard the aircraft;
determination of the altitude of the landing zone by subtracting said height with respect to the altitude of the aircraft;
the symbol displayed is:
a reference point when the aircraft is at a distance from the landing zone greater than a threshold distance, the distance between the aircraft and the landing zone being advantageously displayed in the vicinity of the reference point;

a two-dimensional representation superimposed on the landing zone when the aircraft is at a distance from the landing zone less than the threshold distance; and the identification method further comprises a step of readjusting the matching of the symbol with respect to the landing zone on the display system, performed by an operator of the aircraft.

The invention further relates to a computer program comprising software instructions which, when executed by a computer, implement a method as defined above.

A further subject matter of the invention is an electronic device for identifying a landing zone and for displaying on a head-up display system onboard an aircraft, a symbol matching said landing zone, the aircraft being apt to fly over a terrain and to land on said landing zone of the terrain, the aircraft being a helicopter, a drone or an electric vertical take-off and landing aircraft, the electronic display device comprising:

an acquisition module configured for acquiring the geographical position of the landing zone during a hovering phase of the aircraft over the landing zone; and a display module configured for displaying on the head-up display system, a symbol conforming to the landing zone at the recorded geographical position, during a flight of the aircraft towards the landing zone

BRIEF DESCRIPTION OF THE DRAWINGS

Such features and advantages of the invention will become clearer upon reading the following description, given only as a non-limiting example, and made with reference to the enclosed drawings, wherein.

DESCRIPTION OF THE PREFERRED EMBODIMENTS

Hereinafter, the term "vertical" is generally understood as oriented along the direction of the force of gravity. The term "horizontal" is generally understood as perpendicular to the vertical direction, which is along the force of gravity.

Figure 1:
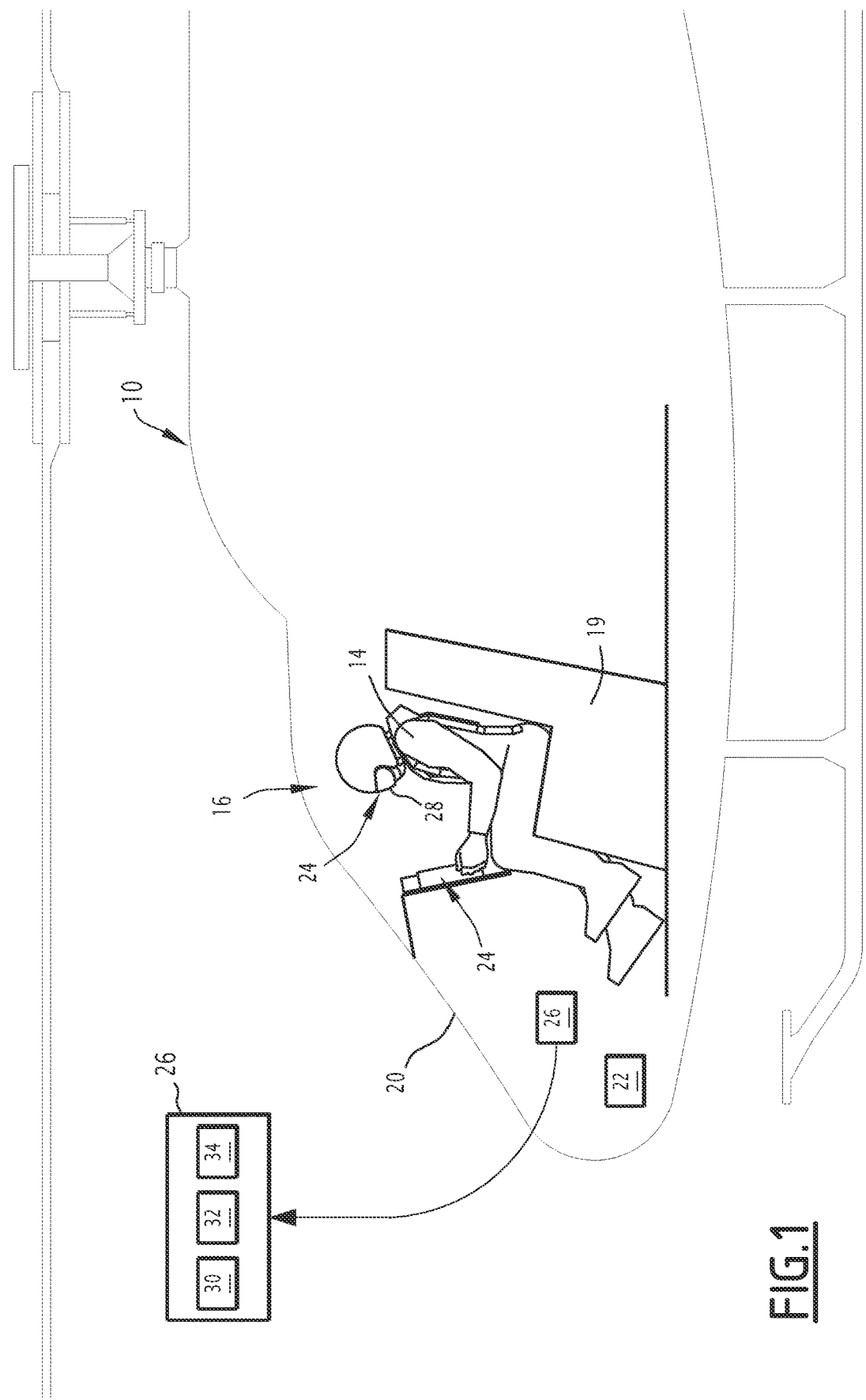
FIG. 1 is a schematic side view of the cockpit of an aircraft.
Figure 2:
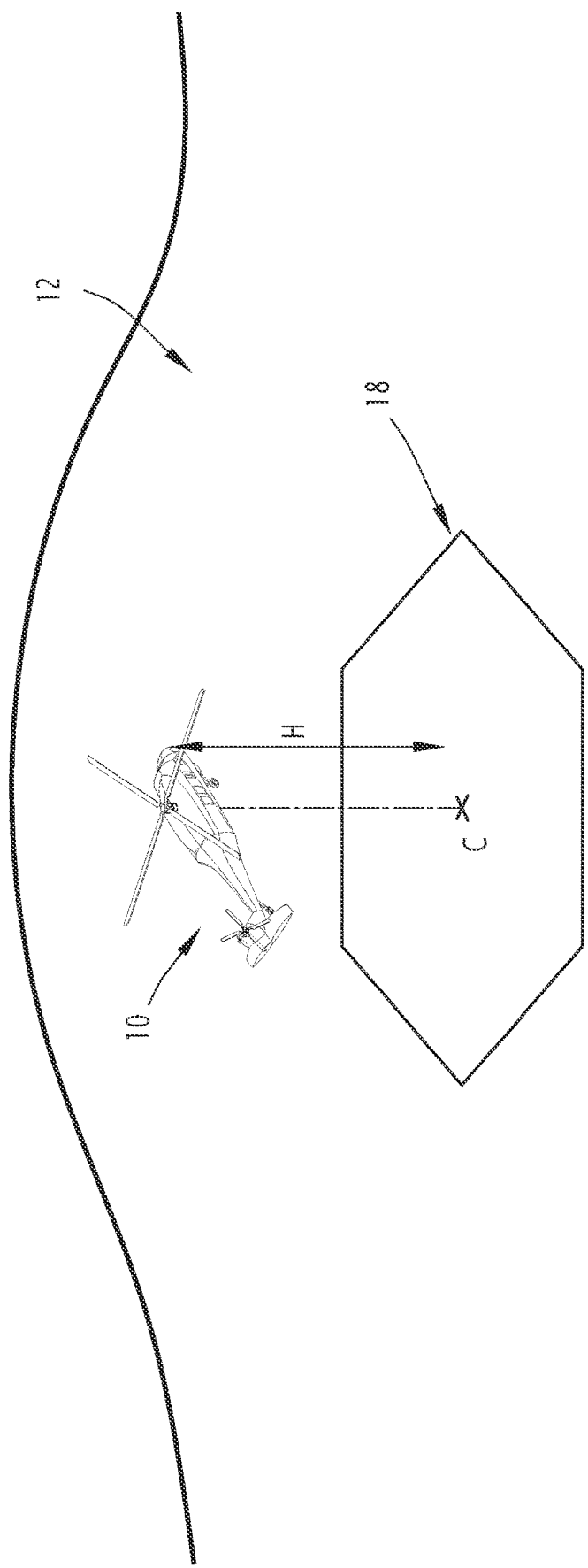
FIG. 2 is a perspective view of a hovering of the aircraft shown in FIG. 1, over a landing zone.
Figure 3:
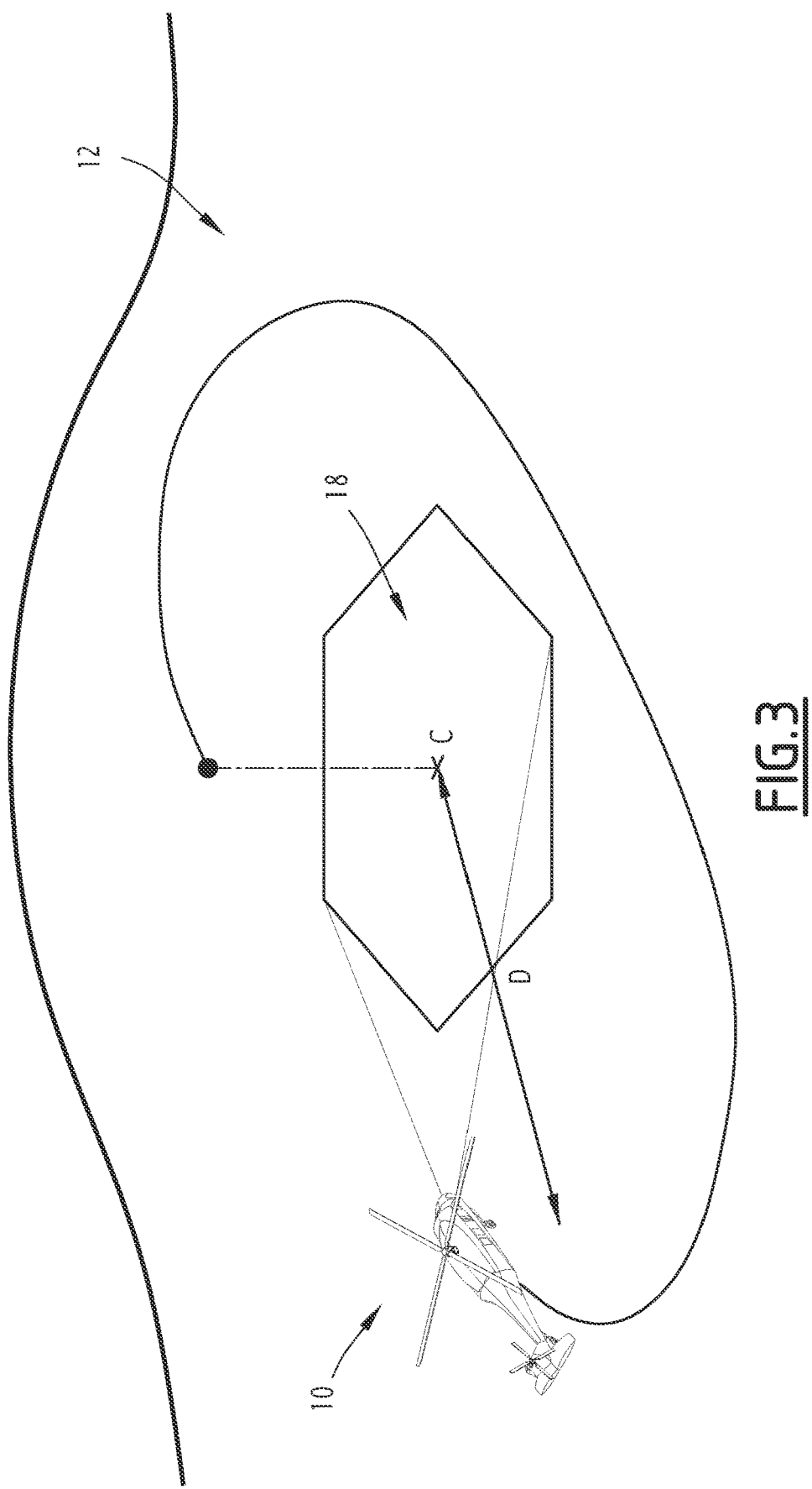
FIG. 3 is a perspective view of the aircraft shown in FIG. 1, along the direction of the landing zone.

An aircraft 10 is shown in FIGS. 1 to 3.

As can be seen in particular in FIGS. 2 and 3, the aircraft 10 is apt to fly over a terrain 12. The terrain 12 is e.g. a desert, a dusty or snowy terrain.

Aircraft 10 is herein a helicopter.

In a variant, the aircraft 10 is a drone.

In another variant, the aircraft 10 is an electric vertical take-off and landing aircraft, also called eVTOL.

In other words, the aircraft 10 is a flying machine suitable for hovering.

The aircraft 10 can be piloted by a pilot 14 via a control station 16, the control station being arranged inside the aircraft 10 or at a distance from the aircraft 10, in particular in the case of a drone.

The aircraft 10 is suitable for landing on a landing zone 18 of the terrain 12.

The landing zone 18 is in particular any part of the terrain 12, or e.g. an airfield covered with snow.

It is thus understood that the landing zone 18 is in the form of a surface or of a geographical point.

The landing zone 18 is defined by geographical coordinates, such as latitude, longitude, and altitude in a geodetic system.

The control station 16 is herein a cockpit of the aircraft 10. As can be seen in FIG. 1, the control station 16 includes at least one seat 19 for the pilot 14, a windscreen 20 at least partially transparent and separating the inside of the cockpit from the outside environment of the aircraft 10, a plurality of positioning sensors 22, and at least one display set.

The positioning sensors 22 are configured for determining the geographical position of the aircraft 10, in particular defined by geographical coordinates, such as a latitude, a longitude and an altitude in a geodetic system.

The positioning sensors 22 comprise in particular, a radio altimeter, a barometric altimeter and a satellite positioning system.

The radio altimeter is configured for measuring the relative height of the aircraft 10 with respect to the terrain 12 and in particular, above the landing zone 18 when the aircraft 10 is located vertically above the landing zone 18. The radio altimeter comprises in particular, an antenna transmitting a wave towards the terrain 12, where the wave is diffusely reflected. Part of the energy is thus re-emitted towards the aircraft 10 and picked up by a receiver antenna. The height is then determined according to the time taken by the wave to make the round trip.

The barometric altimeter is configured for the altitude of the aircraft 10. "Altitude" means the elevation of a point above mean sea level. The barometric altimeter is configured for measuring a difference in atmospheric pressure between the reference level, particularly sea level, and the altimeter level.

The satellite positioning system (also conventionally referred to as GNSS for "Global Navigation Satellite System") is configured for measuring the latitude and the longitude of the aircraft 10.

The display assembly comprises a display system 24 and an electronic device 26 for identifying a landing area.

The display system 24 comprises a head-up display. The head-up display screen 24 is at least partially transparent. Advantageously, the head-up display 24 is a visor 28 integrated into a helmet suitable for being worn by the pilot 14, as shown in FIG. 1. As a variant, the head-up display 24 is a transparent surface attached in the cockpit and placed in front of the pilot 14.

According to another embodiment, not shown, the aircraft 10 is a drone which can be remotely piloted via a control station 16, e.g. a ground control station, from which the drone is piloted. The control station 16 includes herein at least the seat 19 of the pilot 12 and the display screen 24 and at least one environment display screen, not shown. The environment display screen is configured for displaying the external environment of the aircraft 10 filmed from at least one onboard camera by the drone and/or for displaying a synthetic topographic rendering.

As can be seen on FIG. 1, the electronic identification device 26 comprises an acquisition module 30 and a display module 32.

The electronic device 26 advantageously further comprises a readjustment module 34 for correcting any possible offset perceived by the pilot when the pilot superimposes the symbology displayed in his/her head-up display screen thereof on the landing zone seen through his/her head-up display screen thereof, while the visibility conditions are still good, such offset can be due to the accumulation of residual errors coming from the positioning sensors and from the errors in the display chain.

As will be explained in more detail hereinafter, the acquisition module 30 is configured for acquiring the geographical position of the landing zone 18 during a hovering of the aircraft 10 over the landing zone 18.

In particular, the acquisition module 30 is configured for acquiring the latitude and the longitude of the landing zone 18 by means of the satellite positioning system.

"Latitude and longitude of the landing zone 18" means the latitude and the longitude of the center of the landing zone 18, represented by the point C in FIGS. 2 and 3.

The satellite positioning system is configured in particular, for measuring the latitude and the longitude of the aircraft 10 and the acquisition module 30 is configured for deducing therefrom the latitude and the longitude of the landing zone 18. Indeed, when the aircraft 10 is hovering over the landing zone 18, the latitude and the longitude of the center C of the landing zone 18 are equal to the latitude and to the longitude of the aircraft 10.

With reference to FIG. 3, the acquisition module 30 is further configured for acquiring the relative height H of the aircraft 10 above the landing zone 18 by means of the radio altimeter.

The acquisition module 30 is further configured for acquiring the altitude of the aircraft 10 by means of the barometric altimeter.

The acquisition module 30 is further configured for determining the altitude of the landing zone 18 by subtracting the relative height H of the aircraft 10 above the landing zone 18 from the altitude of the aircraft 10.

The display module 32 is configured for displaying on the head-up display system 24, during a flight of the aircraft 10 towards of the landing zone 18 as represented in FIG. 3, a symbol conforming to the landing zone 18 at the recorded geographical position.

Conforming symbol refers to a cartographic and symbolic representation which superimposes exactly over the terrain actually seen by the pilot.

Figure 4:
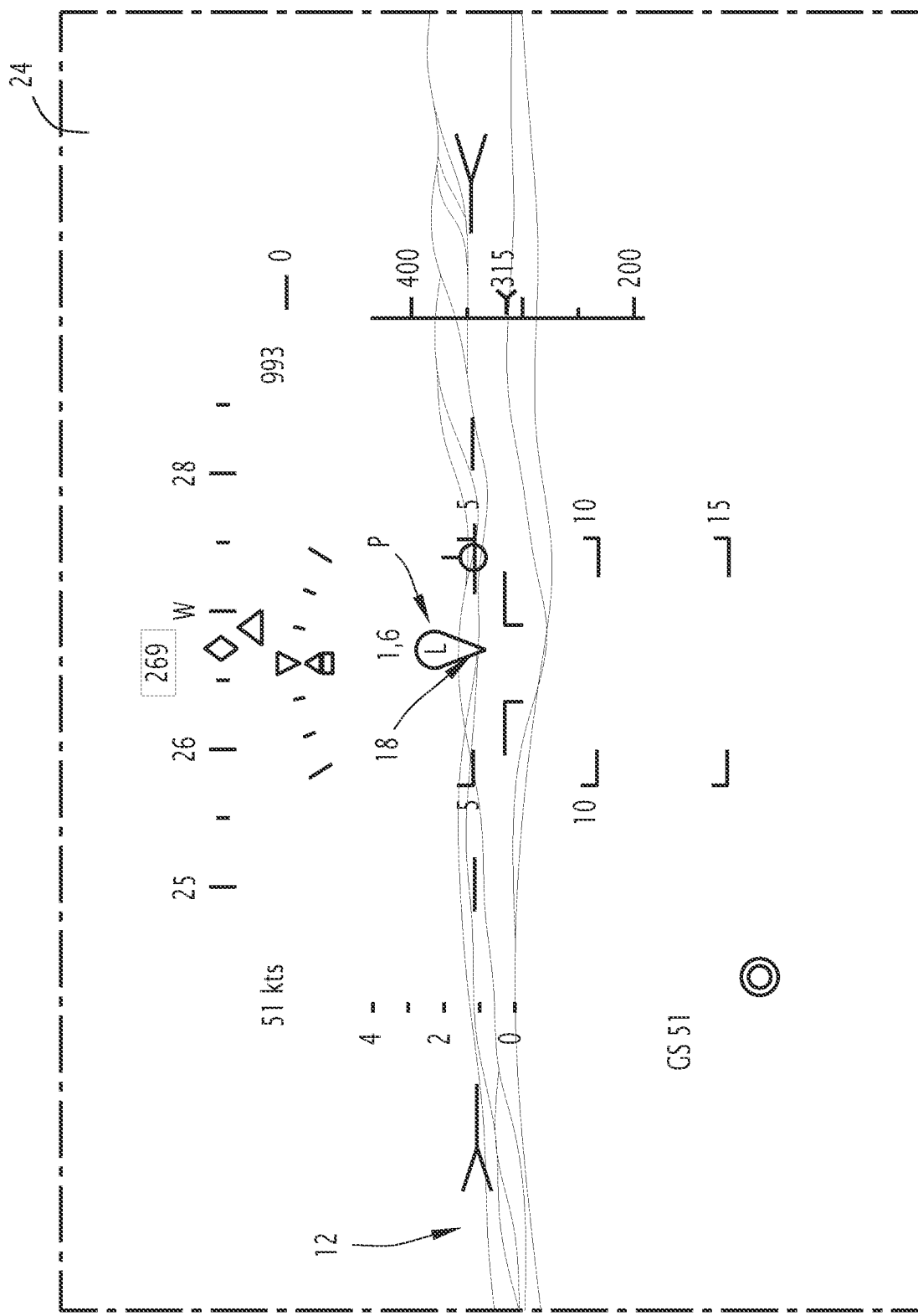
FIG. 4 is a representation of a view displayed on a display system arranged in the aircraft shown in FIG. 1.

In particular, as shown in FIG. 4, the symbol is a reference point P when the aircraft 10 is at a distance D from the landing zone 18 greater than a threshold distance.

With reference to FIG. 3, the distance D between the aircraft 10 and the landing zone 18 is e.g. calculated with reference to the center of the landing zone.

The threshold distance is e.g. equal to 250 m.

The display module 32 is advantageously configured for displaying the distance D between the aircraft 10 and the landing zone 10 in the vicinity of the reference mark P.

Displayed in the vicinity means displayed next to or above the reference mark P.

The readjustment module 34 is configured for acquiring at least one adjustment value entered by the pilot 14. The acquisition of such adjustment value is performed e.g. by using a dedicated control box or by a displacement of a finger of the pilot 14 on a head-down display touchscreen arranged in the cockpit of the aircraft 10.

In a variant, the adjustment value is entered manually by the pilot by means of a numeric keypad.

In particular, the readjustment module 34 is configured for acquiring an altitude adjustment value, a longitude adjustment value, and a latitude adjustment value.

Based on such adjustment value, the display module 32 is further configured for displaying the symbol at a position, with respect to the terrain 12, corrected by using the acquired adjustment value(s).

Indeed, the geographical coordinates of the landing zone 18 acquired by the acquisition module 30 of the landing zone 18, can have an offset with respect to the real coordinates, in particular due to the inaccuracies of the satellite positioning system.

The pilot 14 can thus adjust the position of the symbol associated with the landing zone 18 so that the symbol the pilot 14 displays on the display screen corresponds to the real terrain 12.

In the example shown in FIG. 3, the electronic tool 26 comprises an information processing unit consisting e.g. of a memory and of a processor associated with the memory. The acquisition module 30, the display module 32, and, as an optional supplement, the readjustment module 34, are each produced in the form of a software program, or a software brick, which can be run by the processor. The memory of the electronic device 26 is then apt to store an acquisition software, a display software and, as an optional supplement, a readjustment software. The processor is then apt to run each of said software programs.

In a variant (not shown), the acquisition module 30, the display module 32, and, as an optional supplement, the readjustment module 34 are each produced in the form of a programmable logic component, such as an FPGA (Field Programmable Gate Array), or further of a dedicated integrated circuit, such as an ASIC (Application Specific Integrated Circuit).

When the electronic identification device 26 is produced in the form of one or a plurality of software programs, i.e. in the form of a computer program, same is further apt for being recorded on a computer-readable medium (not shown). The computer-readable medium is e.g. a medium apt to store the electronic instructions and to be coupled to a bus of a computer system. As an example, the readable medium is an optical disk, a magneto-optical disk, a ROM memory, a RAM memory, any type of non-volatile memory (e.g. EPROM, EEPROM, FLASH, NVRAM), a magnetic card or an optical card. A computer program containing software instructions is then stored on the readable medium.

Figure 6:
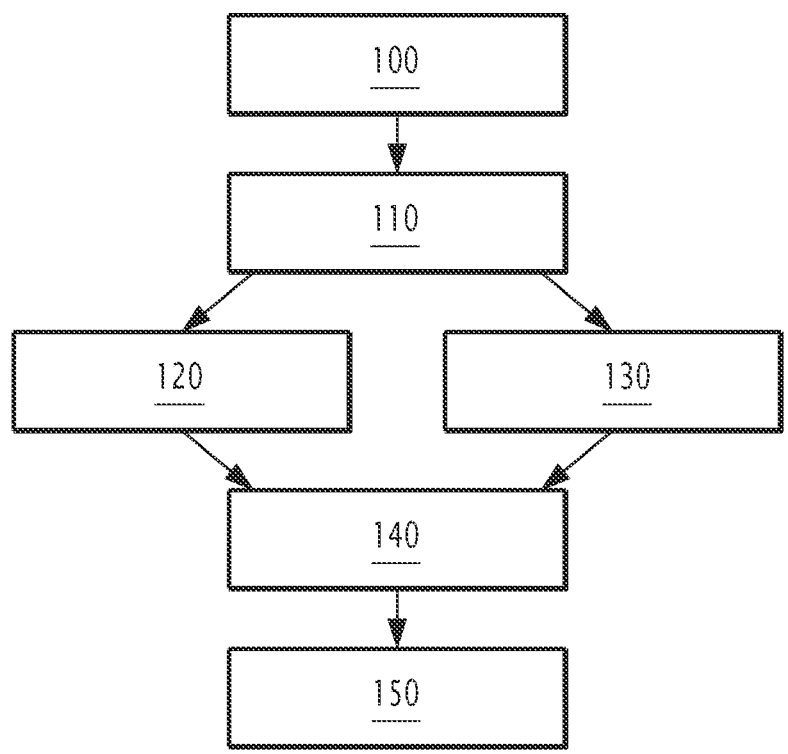
FIG. 6 is an flow chart of an identification method according to the invention.

The operation of the electronic identification device 26 according to the invention will henceforth be explained with the help of FIG. 6 which represents an organization chart of the method according to the invention, for identifying a landing zone 18 and for displaying on the head-up display system 24 onboard an aircraft, a symbol conforming to the runway, the method being implemented by the electronic display device 26.

Initially, the aircraft 10 flies over the terrain 12.

The aircraft 10 flies toward the landing zone 18 on which the pilot 14 wishes to land the aircraft 10.

Then, during an initial step 100, as shown in FIG. 2, the aircraft 10 hovers over the landing zone 18.

In other words, the aircraft 10 remains immobile in the reference frame of the terrain 12, at a constant height with respect to the landing zone 18, for a period of at least three seconds, advantageously at least five seconds.

The hovering is carried out at a height from the terrain greater than 15 m such that the wind generated by the rotor flow does not lift particles from the ground.

Thus, the aircraft 10 hovers without ground effect, i.e. without any "brown-out" or "white-out" effect.

Then, the method comprises a step 110 of acquiring the geographical position of the landing zone 18.

In particular, during hovering, the pilot 14 actuates a control located in the cockpit of the aircraft 10. The control then activates the acquisition module 30 of the electronic device 26.

In a variant, the acquisition module 30 activates automatically when hovering above the landing zone 18 is detected.

As explained hereinabove, the acquisition step 110 then comprises the sub-steps of:
  acquisition of the latitude and the longitude of the landing zone 18 by means of the satellite positioning system of the aircraft 10;
  acquisition of the relative height H of the aircraft 10 above the landing zone 18 by means of the radio altimeter of the aircraft 10;
  acquisition of the altitude of aircraft 10 by means of the barometric altimeter of the aircraft 10;
  determination of the altitude of the landing zone 18 by subtracting said height H with respect to the altitude of the aircraft 10.

Then, during a step 120, the aircraft 10 moves away and then flies towards the landing zone 18.

In particular, as shown in FIG. 3, the aircraft 10 performs a reconnaissance pass (either left or right depending on the constraints of the environment) so as to face the wind, with the landing zone 18 in sight for the pilot and hovers again at a distance from the landing zone 18.

Figure 5:
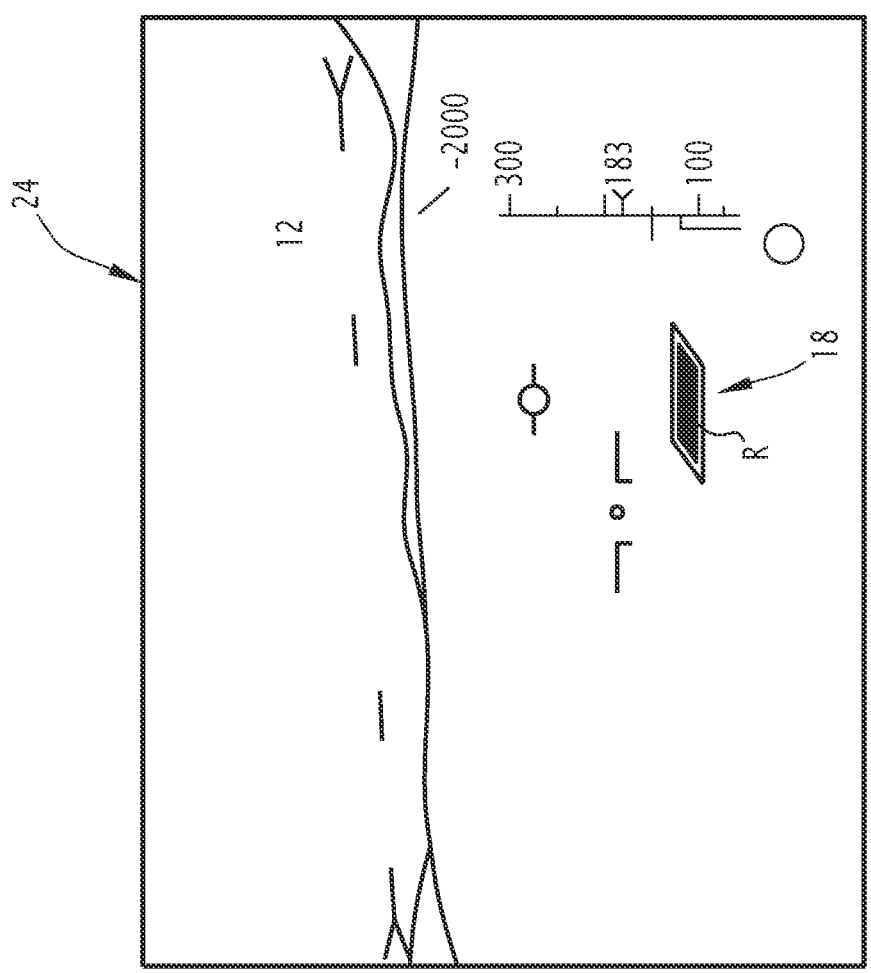
FIG. 5 is another representation of a view displayed on a display system arranged in the aircraft shown in FIG. 1.

As shown in FIGS. 4, 5 and 6, the method comprises, in parallel with the step 120, a step 130 of displaying on the head-up display system 24, the symbol conforming to the landing zone 18 at the recorded geographical position.

Such display of the landing zone 18 at the geographical position recorded during the step 110 is advantageously performed when the aircraft 10 is at a distance from the landing zone 18 greater than a threshold value, e.g. equal to 20 m.

When the aircraft 10 is at a distance from the landing zone less than the threshold value, the value of the height measured by the radio altimeter is considered directly to display the conforming symbol associated with landing zone 18. Indeed, starting from the threshold distance, the ground can be considered as flat and at the same level as the landing zone 18.

The method then comprises a step 140 of possible readjustment by the pilot, of the conformity of the symbol with respect to the landing zone 18, on the display system 24.

Then, during a final step 150, the aircraft 10 descends and sets the aircraft down on the landing zone 18 using the symbol displayed on the head-up display system 24.

In this way, it can be understood that the present invention has a certain number of advantages.

Indeed, the invention makes it possible to help the pilot to land on a landing zone 18, in particular under degraded visibility conditions.

Thus, the invention can be used for a safer landing of the aircraft under conditions of reduced visibility.

Furthermore, the invention is easy to implement. The method according to the invention makes it possible in particular, to dispense with the a priori knowledge of the coordinates of the landing zone.

The invention is also inexpensive to implement since same does not require expensive and bulky additional sensors to be carried onboard.

The method according to the invention advantageously allows the pilot to manually adjust the lateral and vertical position of the landing aid symbol, and then to check the correct positioning of the symbol by visual feedback.

The invention claimed is:

1. A method for identifying a landing zone and for displaying on a head-up display system onboard an aircraft, a symbol conforming to said landing zone, the aircraft being apt to fly over a terrain and to land on said landing zone of the terrain, the aircraft being a helicopter, a drone or an electric aircraft with vertical take-off and landing;
the method comprising at least the following steps:
  hovering the aircraft over the landing zone and acquiring a geographical position of the landing zone; and
  flying the aircraft towards the landing zone and displaying, on the head-up display system, the symbol conforming to the landing zone at the acquired geographic position,
  wherein the acquiring of the geographical position of the landing zone is performed by actuating a control, during hovering, by an operator of the aircraft.

2. The identification method according to claim 1, wherein the hovering is performed at a height from the terrain greater than 15 m.

3. The identification method according to claim 1, wherein the acquiring the geographical position of the landing zone comprises:
  acquiring a latitude and a longitude of the landing zone using a satellite positioning system onboard the aircraft;
  acquiring a relative height of the aircraft above the landing zone by means of a radio altimeter onboard the aircraft;
  acquiring a barometric altitude of the aircraft by means of a barometric altimeter onboard the aircraft;
  determining an altitude of the landing zone by subtracting said height with respect to the barometric altitude of the aircraft.

4. The identification method according to The identification method according to
wherein the displayed symbol is:
  a reference point when the aircraft is at a distance from the landing zone greater than a threshold distance;
  a two-dimensional representation superimposed on the landing zone when the aircraft is at a distance from the landing zone less than the threshold distance.

5. The identification method according to claim 4, wherein when the aircraft is at a distance from the landing zone greater than a threshold distance, the distance between the aircraft and the landing zone is displayed in a vicinity of the reference point.

6. The identification method according to claim 1, wherein the identification method further comprises readjusting, by an operator of the aircraft, a conformity of the symbol with respect to the landing zone on the display system.

7. A non-volatile computer-readable medium on which is stored a computer program including software instructions which, when executed by a computer, cause the computer to implement the identification method according to claim 1.

8. The identification method of claim 1, further comprising the aircraft moving away from the landing zone after said hovering and prior to said flying towards the landing zone.

9. An electronic device for identifying a landing zone and for displaying on a head-up display system onboard an aircraft, a symbol conforming to said landing zone, the aircraft being apt to fly over a terrain and to land on said landing zone of the terrain, the aircraft being a helicopter, a drone or an electric aircraft with vertical take-off and landing, the electronic display device comprising:

an acquisition module configured for acquiring a geographic position of the landing zone during a hovering phase of the aircraft above the landing zone, the acquisition module being configured to be actuated by a pilot of the aircraft during hovering; and a display module configured for displaying on the head-up display system, the conforming symbol of the landing zone at the acquired geographic position, during a flight of the aircraft towards the landing zone.

* * * * *